United States Patent
Brossi et al.

[15] 3,684,810
[45] Aug. 15, 1972

[54] PROCESS FOR 2,4-DIAMINO-5-(3,5-DIMETHOXY-4-HYDROXYBENZYL) PYRIMIDINE

[72] Inventors: Arnold Brossi, Verona; Sidney Teitel, Clifton, both of N.J.

[73] Assignee: Hoffmann-La Roche Inc., Nutley, N.J.

[22] Filed: March 11, 1970

[21] Appl. No.: 18,747

[52] U.S. Cl. ..................................260/256.4 N
[51] Int. Cl. ..................................C07d 51/42
[58] Field of Search.........................260/256.4 N

[56] References Cited

UNITED STATES PATENTS 3,485,840  12/1969  Hoffer..................260/251

*Primary Examiner*—Alex Mazel
*Assistant Examiner*—R. V. Rush
*Attorney*—Samuel L. Welt, Jon S. Saxe, Bernard S. Leon and William G. Isgro

[57] ABSTRACT

The preparation of 2,4-diamino-5-(3,5-dimethoxy-4-hydroxybenzyl)pyrimidine by treating 2,4-diamino-5-(3,4,5-trimethoxybenzyl)pyrimidine with a mineral acid is described.

3 Claims, No Drawings

PROCESS FOR 2,4-DIAMINO-5-(3,5-DIMETHOXY-4-HYDROXYBENZYL) PYRIMIDINE

BACKGROUND OF THE INVENTION

The antibacterially active 2,4-diamino-5-(3,5-dimethoxy-4-hydroxybenzyl)pyrimidine has been prepared in the prior art from 2,4-diaminopyrimidine and 2,6-dimethoxy-4-(dimethylaminomethyl)phenol. The present invention provides a method which utilizes the more readily accessible precursor, i.e., 2,4-diamino-5-(3,4,5-trimethoxybenzyl)pyrimidine.

BRIEF SUMMARY OF THE INVENTION

The invention comprises treating 2,4-diamino-5-(3,4,5-trimethoxybenzyl)pyrimidine with a mineral acid to form 2,4-diamino-5-(3,5-dimethoxy-4-hydroxybenzyl)pyrimidine.

DETAILED DESCRIPTION OF THE INVENTION

The invention provides a facile method for the selective mono-dimethylation of 2,4-diamino-5-(3,4,5-trimethoxybenzyl)pyrimidine. More particularly, the invention comprises treating 2,4-diamino-5-(3,4,5-trimethoxybenzyl)pyrimidine with a mineral acid whereby preferential de-etherification is effected to the corresponding 2,4-diamino-5-(3,5-dimethoxy-4-hydroxybenzyl)pyrimidine.

The selective O-demethylation of the middle methoxy group of 2,4-diamino-5-(3,4,5-trimethoxybenzyl)pyrimidine is effected by controlling the reaction which is dependent upon concentration of acid, reaction temperature and reaction time. Under controlled reaction conditions the formation of undesirable polyphenolic products is minimized, whereby substantially pure 2,4-diamino-5-(3,5-dimethoxy-4-hydroxybenzyl)pyrimidine is obtained.

In accordance with the process of the invention, any suitable mineral acid, concentrated or diluted, can be utilized. Exemplary of such acids are hydrohalic acids, such as hydrochloric, hydroiodic or hydrobromic acid; sulfuric acid; dilute nitric acid; phosphoric acid; and the like. Preferably, a hydrohalic acid is utilized.

The O-demethylation can be carried out at a temperature in the range of about −80° to about 200° C. Conveniently, the reaction can be carried out at a temperature in the range of about −60° to about 125° C. Most preferably, the reaction is effected at steam bath temperature or the reflux temperature of the mineral acid mixture. The reaction time to complete the selective O-demethylation of the middle methoxy group of 2,4-diamino-5-(3,4,5-trimethoxybenzyl)pyrimidine is dependent upon the concentration of acid utilized and upon the reaction temperature. Generally, with relatively concentrated acid and the preferred reaction temperatures it is completed in about 1 to 6 hours. Most preferably, the reaction is conducted until such time or just prior to such time as trace amounts of polyphenols are detected. While the formation of polyphenols can generally be avoided by effecting the O-demethylation under the preferred conditions of temperature and reaction time set forth hereinbefore, it is also possible to conduct the reaction under less preferred reaction conditions provided that the course of the reaction is checked and the reaction is stopped upon the detection of trace amounts of polyphenols.

Conveniently, the presence of trace amounts of polyphenols can be detected utilizing thin layer chromatography (tlc), ultraviolet analysis, and the like. When utilizing thin layer chromatography,* Fine microsize silicone dioxide with 13 percent calcium sulfate binder, developed for 15 cm, in 40 ethyl acetate: 10 methanol: 1 conc. ammonium hydroxide, detected with a reagent prepared as follows: 8.0 g. of bismuth subnitrate is dissolved in 20 to 25 ml. of 30 percent $HNO_3$ (d 1, 18). This solution is added slowly and with stirring to a solution containing 28 g. of KI and 1 ml. of 6 N-HCl in approximately 5 ml. of water. The dark precipitate redissolves, giving an orange-red solution which is cooled to 5° C., filtered, and diluted to 100 ml. with water. The orange-red stock solution is stable for a few weeks if kept in a dark bottle in the refrigerator. The developing solution ($KBiI_4$ reagent) consists of 20 ml. of water, 5 ml. of 6N-HCl, 2 ml. of Dragendorff stock solution an 5 ml. of 6N-NaOH, added in this order. A few drops of 6N-HCl may be added if all of the $Bi(OH)_3$ does not dissolve on shaking. The $KBiI_4$ reagent is stable for 10 days when kept in the refrigerator. the reaction is continued until the appearance of a main spot at Rf = about 0.75. Overheating beyond this point will cause the formation of polyphenols and should therefore be avoided.

The separation of the 2,4-diamino-5-(3,5-dimethoxy-4-hydroxybenzyl)pyrimidine can be effected utilizing conventional procedures, for example, by extraction, crystallization and the like.

The following examples further illustrate the invention. All temperatures are in degrees centigrade.

EXAMPLE 1

A mixture of 120 g. (0.41 mol.) of 2,4-diamino-5-(3,4,5-trimethoxybenzyl)pyrimidine and 1 l. of 48 percent hydrobromic acid was stirred at steam temperature for 100 minutes. The solution was cooled, maintained at between 5° and 10° and 240 ml. of 50 percent sodium hydroxide was added over a period of 45 minutes, whereupon crystals formed. The acidic mixture was stirred at room temperature for 90 minutes, filtered and the cake washed with two 100 ml. portions of ice water. The air-dried cake (132 g.) having a melting point of 240°–247° was dissolved in 500 ml. of boiling water, stored at room temperature overnight and filtered. Thereafter, the white crystals were washed with 100 ml. of ice water and air-dried to yield 114 g. (77 percent) of 2,4-diamino-5-(3,5-dimethoxy-4-hydroxybenzyl)pyrimidine, having a melting point of 258°–261°. The compound has been previously described in Netherlands Pat. No. 6,702,397.

Upon altering the concentration of acid, reaction temperature and reaction time in the foregoing example as hereinafter set forth, similar results are obtained:

| Example | Concentration of Acid | Reaction Temperature | Reaction Time |
|---|---|---|---|
| 2) | 48% HBr | 25°C | 17 hours |
| 3) | 48% HBr | 100°C | 1/2 hour |
| 4) | 20% HCl | 120°C | 2 hours |
| 5) | Liquid HBr | −00°C | 17 hours |

We claim

1. A process for the preparation of 2,4-diamino-5-(3,5-dimethoxy-4-hydroxybenzyl)pyrimidine which comprises treating 2,4-diamino-5-(3,4,5-trimethoxybenzyl)pyrimidine with a mineral acid selected from the group consisting of hydrohalic acid, sulfuric acid, dilute nitric acid and phosphoric acid.

2. A process in accordance with claim 1, wherein the treatment is stopped upon detecting trace amounts of polyphenols.

3. A process in accordance with claim 1, which comprises treating 2,4-diamino-5-(3,4,5-trimethoxybenzyl)pyrimidine with 48 percent hydrobromic acid at reflux for a period of between about 1½ and about 2 hours.

* * * * *